United States Patent

Baum et al.

[15] 3,674,933

[45] July 4, 1972

[54] COMMUNICATIONS CABLES HAVING REDUCED INTERFERENCE CHARACTERISTICS

[72] Inventors: Walter Karl-Theodor Baum, Leyherstrasse 15; Otto Breitenbach, Backlerstrasse 25, both of 85 Nurnberg, Germany

[22] Filed: Nov. 5, 1969

[21] Appl. No.: 874,225

[30] Foreign Application Priority Data

Nov. 7, 1968 Germany ......................P 18 07 408.3

[52] U.S. Cl. ..............................................178/69 B, 307/90

[51] Int. Cl. .........................................................H04b 3/32

[58] Field of Search ................178/69 B; 307/90, 91; 179/78; 333/12

[56] References Cited

UNITED STATES PATENTS

| | | | |
|---|---|---|---|
| 1,649,863 | 11/1927 | Shanck | 178/69 B |
| 1,865,571 | 6/1932 | Kline | 178/69 B |
| 2,075,218 | 3/1937 | Miyazaki | 179/78 |
| 3,440,440 | 4/1969 | Prohofsky et al. | 333/12 |

*Primary Examiner*—William C. Cooper
*Assistant Examiner*—Douglas W. Olms
*Attorney*—Philip G. Hilbert

[57] ABSTRACT

A communications cable comprising a core with at least a first and a second signal conductor and a sheath of conductive material. The first signal conductor carries the communication signals. The input of an amplifier is connected to the second signal conductor while the output of the amplifier is connected at least to the sheath so that any voltages developed across the second signal conductor and the sheath are fed via the amplifier to the sheath to neutralize their effect on the core.

8 Claims, 7 Drawing Figures

INVENTORS
Walter Baum
Otto Breitenbach
BY
Philip S. Hilbert
ATTORNEY

COMMUNICATIONS CABLES HAVING REDUCED INTERFERENCE CHARACTERISTICS

This invention pertains to communications cables and more particularly to markedly reducing signal interference characteristics of such cables.

In communication cables whose sheaths have an finite impedance in relation to ground and which are situated in the interference region of power circuits, e.g. electric railroads, interfence arises. Such interference stems from the voltage difference between the central signal conductors and ground or the sheath of the cable. Such interference is normally reduced by a step-down transformer with or without amplification over the entire length of the cable system.

However, there remains a residual voltage between the signal conductors and the sheath in every section of the cable. Inasmuch as the symmetry of the individual signal conductor pairs in never complete with respect to the sheath, such residual voltage causes a voltage difference between the individual conductors, the so-called noise voltage can not be reduced by known conventional means.

Moreover, the noise voltage depend on the frequency spectrum of the interfering voltage. Through the use of thyristor-controlled power installations, as in electric locomotives, the audio-frequency component of this interference in the supply circuit is substantially increased and leads to a noise voltage whose frequency spectrum and magnitude exceeds tolerable levels.

Accordingly, an object of this invention is to provide a circuit for the reduction of the voltage difference between the cable core or signal conductors of a communication cable that is subject to interference from a power circuit and its sheath, to thereby materially reduce the noise or interfering voltage that occurs because of such voltage difference and the asymmetry of the cable structure.

Briefly, the instant invention satisfies this object by applying the voltage difference between the sheath and a signal conductor of the multi-signal conductor cable core to an amplifier whose output voltage is applied between the sheath and ground with such amplitude and phase that the voltage difference that exists between the cable core and the sheath is reduced. The remaining signal conductors carry communication signals.

The particular advantage of the invention is that at least a partial cancellation of the noise voltage becomes possible in cable sections that are already laid down and which subsequently become exposed to interfering power circuits.

Other objects of this invention will in part be obvious and in part hereinafter pointed out.

DESCRIPTION OF THE PREFERRED EMBODIMENTS

Figure 1:
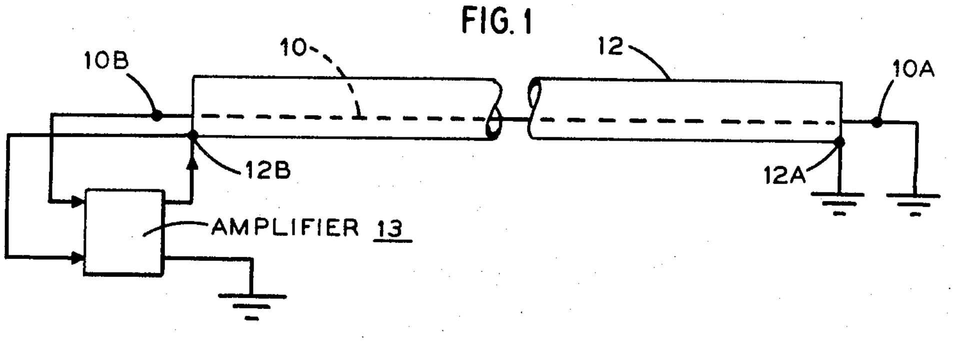
FIG. 1 is a schematic showing of a single communication cable embodying the invention.

In FIG. 1 is shown a communication cable having a cable core with a signal conductor 10 surrounded by a sheath 12. Although but a single signal conductor is shown, it is understood that a number of such conductors or wires are within sheath 12. The remaining wires will carry the usual communications signals while the single signal conductor will be used to reduce interference.

One end 10A of conductor 10 is grounded and similarly the corresponding end 12A of sheath 12 is also grounded. The other ends 10B and 12B of the signal conductor 10 and sheath 12 are connected across the input of a signal amplifier 13. One side of the output of amplifier 13 is connected to end 12B of sheath 12; and the other side of the output of amplifier 13 is grounded.

Thus, the voltage difference developed across the ends 10B of of conductor 10 and 12B of sheath 12 is amplified by amplifier 13, which is preferably of the transformer output type; and fed back in cancelling phase to sheath 12.

Figure 2:
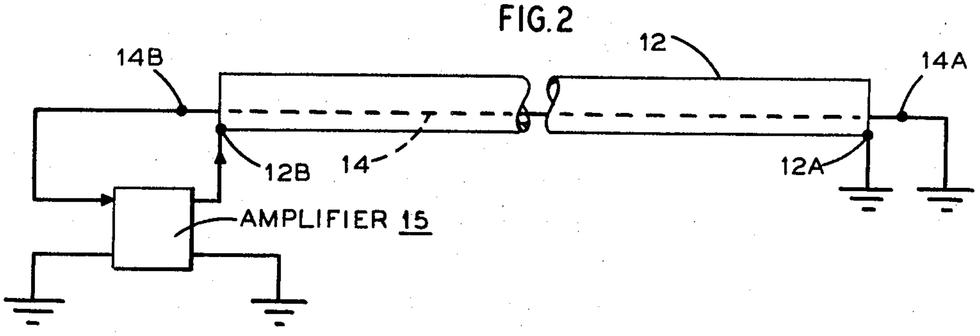
FIG. 2 is a view similar to that of FIG. 1 and showing another embodiment of the invention.

In FIG. 2, the system shown, includes sheath 12 and conductor 14 with their corresponding ends 12A, 14A grounded. An amplifier 15, having a common ground reference, has its input connected to end 14B of conductor 14 and its output connected to corresponding end 12B of sheath 12. In this variation, the voltage difference is with respect to ground.

The interference herein referred to, builds up along the entire cable length. The effect of the circuit of the invention remains restricted to certain lengths of the cable in the case of cables whose sheaths have finite impedance to ground. It will therefore be necessary to provide, for longer cable lengths, several protective units containing the circuits of the instant invention.

Accordingly, there is provided in cables having successive sections, circuits in accordance with the invention which are distributed along the length of the cable. In these circuits, the input of each amplifier is provided by wires that serve to supply the voltage difference of adjacent cable sections and in which the output is applied to the separated adjacent sections of sheaths.

Figure 3:
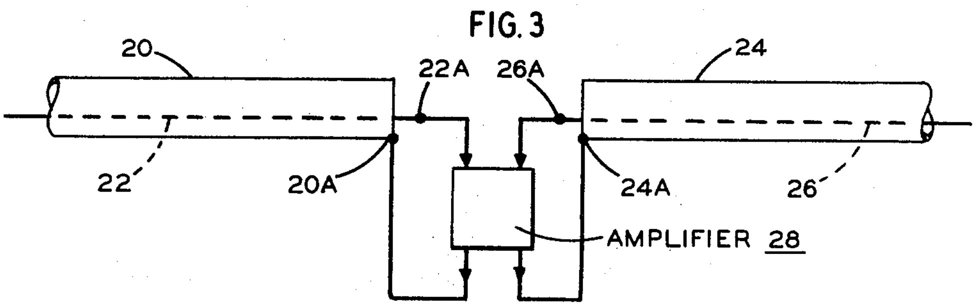
FIG. 3 is a schematic showing of a multi-section cable embodying the invention.

In FIG. 3, there is shown one section of communication cable comprising sheath 20 and signal conductor 22; together with another cable section comprising sheath 24 and signal conductor 26. One end 22A of conductor 22 is connected to one input of an amplifier 28 while the adjacent end 26A of conductor 26 is connected to the other input of amplifier 28, so that the difference voltage between conductors 22 and 26 is applied as an input signal to the amplifier.

One output of amplifier 28 is connected to the end 20A of sheath 20, and the opposite phased output of amplifier 28 is connected to end 24A of sheath 24. The output connections are such that voltage cancellations occur in the corresponding cables.

Figure 4:
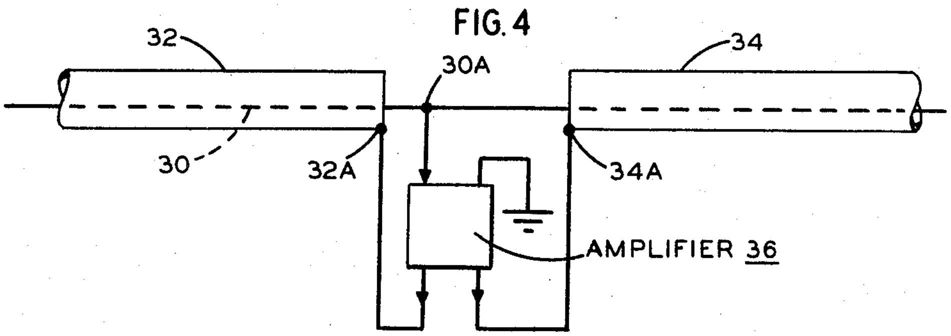
FIG. 4 is a view similar to that of FIG. 3 and showing a signal conductor above ground potential.

A variation of the multisection cable system, using a continuous signal conductor, is shown in FIG. 4. Here the signal conductor 30 runs continuously through the successive sections of the cable and is above ground potential. A tap 30A at the junction of two cable sections is applied to one input of an amplifier 36 whose other input is grounded, so that the difference voltage applied to the amplifier is the difference in potential between the signal conductor 30 and ground. One output of amplifier 36 is connected to the end 32A of sheath 32 of one cable section while the other and opposite phased output of amplifier 36 is connected to the end 34A of sheath 34 of the adjacent cable section.

If an isolating transformer is connected at the ends of a length of cable and if the windings of such transformer are shielded individually, then there is a particular advantage in connecting to each shield the corresponding output side of the amplifier. This is shown in FIG. 5 where by way of example, the cable is connected to a station by means of an isolating transformer.

Figure 5:
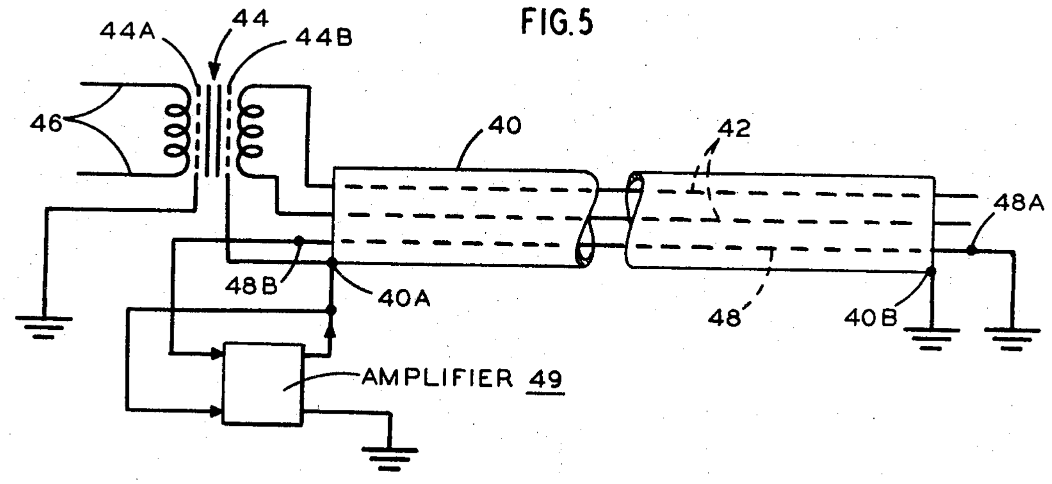
FIG. 5 is a showing of another embodiment of the invention and including an isolation transformer at one end of the cable.

Thus, as shown in FIG. 5, the communication cable comprising sheath 40 and signal conductor pair 42 is connected via isolation transformer 44 to a station, not shown. In particular, one end of signal conductor pair 42 is connected to one winding of transformer 44 while one end of the signal conductor pair 46 of said station is connected to the other winding of transformer 44.

Each winding is provided with a shield. Shield 44A of the station-side winding is grounded; and shield 44B of the cable side winding is connected to the adjacent end 40A of sheath 40 whose remote and 40B is grounded. The two inputs of amplifier 49 are connected to end 40A of sheath 40 and end 48B of a conductor 48 extending through sheath 40; the remote end 48A thereof being grounded. Thus, the voltage across conductor 48 and sheath 40 is applied to amplifier 49.

One end of the output of amplifier 49 is applied to end 40A of sheath 40 and to shield 44B. The other end of the output of amplifier 49 is grounded. It should be noted that the circuit configuration of FIG. 5 is analogous to that of FIG. 1.

Figure 6:
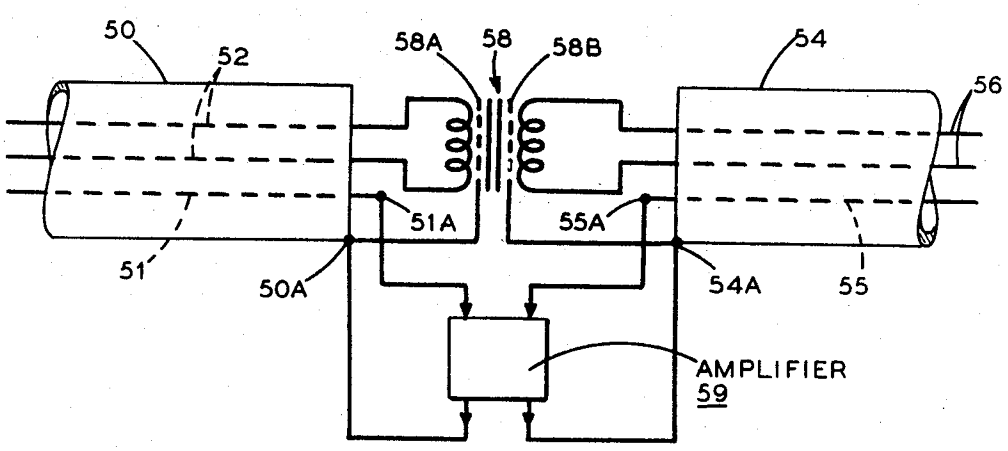
FIG. 6 is a view similar to that of FIG. 5, and applied to multisection cables.

In FIG. 6, one section of cable comprising sheath 50 and signal conductor pair 52, is connected via shielded isolation transformer 58 to another section of the cable comprising shield 54 and signal conductor pair 56. The winding shield 58A is connected to end 50A of sheath 50; and winding shield 58B is connected to end 54A of sheath 54. Conductor 51 extending through sheath 50 is connected at 51A to one input of amplifier 59; and conductor 55 extending through sheath 54, is connected at 55A to the other input of amplifier 59; so that the voltage difference across conductors 51, 55 is applied as an input signal to the amplifier. One output of amplifier 59 is connected to end 50A of sheath 50 and to shield 58A; while the other end opposite-phased output of said amplifier is connected to the end 54A of sheath 50 and to shield 58B. This circuit configuration is analogous to that of FIG. 3.

Figure 7:
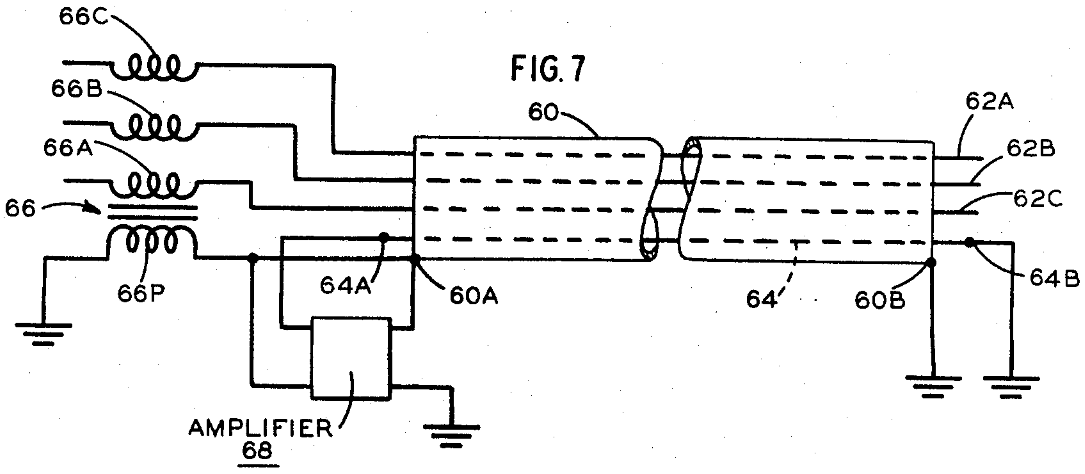
FIG. 7 is another embodiment of the invention, utilizing a step-down transformer.

In accordance with another embodiment of the invention, the cable circuit may incorporate an active step-down transformer such that the amplifier provided for the noise voltage, supplies at the same time the primary side of the step-down transformer, as shown in FIG. 7.

Here the communication cable comprises sheath 60 and signals conductors 62A to 62C and is connected via step-down transformer 66 to a station, not shown. Each signal conductor is connected to one end of a secondary winding 66A to 66C, respectively. The other ends of the secondary windings are connected to the signal outputs of said station. The end 60A of sheath 60 is connected to one end of primary winding 66P whose other end is grounded. The other end 60B of sheath 60 is also grounded.

A pickup conductor 64 extends through sheath 60 and has its remote end 64B grounded. The inputs of amplifier 68 are connected to the end 64A of pickup conductor 64 and end 60A of sheath 60, respectively. One output terminal of amplifier 68 is connected to end 60A of sheath 60 and primary winding 66P while the other output terminal of said amplifier is grounded. If the output of amplifier 68 is a transformer then the output terminals of the amplifier are the ends of the secondary winding of such a transformer.

As the secondary winding of transformer 66 represents a portion of the cable in the sense of the occurrence of a noise voltage, it is subject to the same interfering influences as the elongated portions of the cable. In order to extend the compensating effect of the instant invention to this "wound-on" portion of the cable as well, the use of a shielded cable as the secondary winding of the step-down transformer is desirable. In such case, the ends of the shield are kept at the same potentials as the neighboring sections of the sheath as well as the corresponding amplifier outputs.

Corresponding statements apply for the unsymmetrical arrangement in the sense of FIG. 7, provided that the end of the shield on the station side be kept at ground potential.

The output transformer of amplifier 68 can be omitted in the case where a step-down transformer with a winding consisting of a shielded cable is used, since the function of the output transformer can be assigned to the step-down transformer by means of a suitable primary winding. Thereby, the turns ratio can be chosen in accordance with the requirement and, further, the shield, or a wire electrically in parallel therewith and of sufficient cross-section, can serve for coupling the sheath circuit to the amplifier.

We claim:

1. Communication cable apparatus shielded from external ambient fields comprising: a first communication cable having a plurality of signal conductors being adapted to carry communication signals, another signal conductor coextensive with said plurality of first signal conductors, a sheath of conductive material surrounding said signal conductors; an amplifier having an input means and an output means; means for connecting at least one end of said another signal conductor to said input means of said amplifier; and means for connecting at least the corresponding end of said sheath to said output means of said amplifier whereby the potential difference between said sheath and said another signal conductor due to external ambient fields is minimized.

2 Apparatus as in claim 1 and further comprising a second communication cable having a sheath of conductive material and at least a plurality of signal conductors and another signal conductor, and wherein said input means comprises two input terminals, means for connecting one end of said another signal conductor of one of said communications cables to one of said input terminals, means for connecting one end of said another signal conductor of the other of communications cable to the other input terminal whereby the voltage difference between the two another signal conductors is applied as an input signal to said amplifier, and wherein said output means comprises two output terminals, means for connecting one end of the sheath of one of said communications cables to one of said output terminals, means for connecting one end of the sheath of the other of said communications cables to the other of said output terminals, and means for connecting one end of each of said plurality of signal conductors of one of said communications cables to one end of each of said plurality of signal conductors, respectively of the other of said communications cables.

3. Apparatus as in claim 1 and further comprising a second communications cable having a sheath of conductive material and at least a plurality of signal conductors and another signal conductor, and wherein said input means comprises two input terminals, means for connecting one end of said another signal conductors of each of said communications cables to one of said input terminals, means for connecting the other of said input terminals to ground, and wherein said output means comprises two output terminals, means for connecting one end of the sheath of one of said communications cables to one of said output terminals, means for connecting one end of the sheath of the other of said communications cables to the other of said output terminals, and means for connecting one end of each of said plurality of signal conductors of one of said communications cables to one end of each of said plurality of signal conductors, respectively, of the other of said communications cables.

4. Apparatus as in claim 1 wherein said input means has two input terminals, one of said input terminals being connected to said one end of said second signal conductor, said corresponding one end of said sheath being connected to said other input terminal whereby a voltage difference between said second signal conductor and said sheath is applied to said amplifier as an input signal, and wherein said output means comprises two output terminals, one of said output terminals being grounded and the other of said output terminals being connected to said corresponding one end of said sheath, and amplifier being so constructed to transmit a voltage between ground and said sheath having an amplitude and phase to reduce the voltage difference between said sheath and said second signal conductor.

5. Apparatus as in claim 1 wherein said input means has two input terminals, one of said input terminals being connected to one end of said second signal conductor, the other of said input terminals being grounded whereby a voltage difference between ground and said second signal conductor is applied to said amplifier as an input signal and wherein said output means comprises two output terminals, one of said output terminals being grounded and the other of said output terminals being connected to said corresponding one end of said sheath, the amplifier being so constructed to transmit a voltage between ground and said sheath having an amplitude and phase to reduce the voltage difference between said sheath and said second signal conductor.

6. Apparatus for reducing the noise voltages resulting from ambient interference in a communications cable having a sheath of conductive material, a signal wire pair adapted to carry a communications signal, and a signal conductor, an amplifier having input means and first and second output terminals, means for connecting at least one end of said signal conductor to said input means, means for connecting at least the corresponding end of said sheath to one of said output terminals, an isolation transformer having a primary winding adapted to be connected to a circuit, a secondary winding connected to said signal wire pair, and first and second shields for shielding said primary and secondary windings respectively and wherein said output means comprises first and second output terminals, means for connecting said first output terminal to said first shield and means for connecting said second output terminal to said second shield.

7. Apparatus as in claim 6 and further comprising a second communications cable having a sheath, a first signal conductor and a signal wire pair extending through said sheath, and wherein the signal wire pair of said second communications cable is connected to said primary winding, said input means comprising first and second input terminals, means for connecting one of said input terminals to one end of said signal conductor of one of said communications cables, means for connecting the other input terminal to one end of said first signal conductor of the other of said communications cables, said output means comprising first and second output terminals, means for connecting one of said output terminals to one end of the sheath of one of said communications cables and means for connecting the other of said output terminals to one end of the sheath of the other of said communications cables.

8. Apparatus for reducing the noise voltages resulting from ambient interference in a communications cable having a sheath of conductive material and at least a first and second signal conductor, said first signal conductor being adapted to carry a communications signal, comprising an amplifier having input means and output means, means for connecting at least one end of said second signal conductor to said input means, means for connecting at least the corresponding end of said sheath to said output means, a step-down transformer having a primary winding connected to said output means and a secondary winding connected to said first signal conductor.

* * * * *